(12) United States Patent
Coronado et al.

(10) Patent No.: US 8,904,143 B2
(45) Date of Patent: Dec. 2, 2014

(54) OBTAINING ADDITIONAL DATA STORAGE FROM ANOTHER DATA STORAGE SYSTEM

(75) Inventors: Juan Alonso Coronado, Tucson, AZ (US); Sara Megan Coronado, Tucson, AZ (US); Jennifer Shinobu Shioya, Tucson, AZ (US); Xavier Edgar Somoza, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 552 days.

(21) Appl. No.: 13/250,768

(22) Filed: Sep. 30, 2011

(65) Prior Publication Data

US 2013/0086351 A1    Apr. 4, 2013

(51) Int. Cl.
*G06F 12/00* (2006.01)
*G06F 3/06* (2006.01)
G06F 13/00 (2006.01)
G06F 13/28 (2006.01)

(52) U.S. Cl.
CPC ............... *G06F 3/06* (2013.01); *G06F 3/0631* (2013.01); *G06F 3/0607* (2013.01); *G06F 3/0665* (2013.01); *G06F 3/0646* (2013.01); *G06F 3/0689* (2013.01)
USPC .......................................... 711/171; 711/170

(58) Field of Classification Search
CPC ....... G06F 3/0646; G06F 3/0631; G06F 3/06; G06F 3/0665; G06F 3/0689
USPC ................................. 711/170, 171
See application file for complete search history.

(56) References Cited

U.S. PATENT DOCUMENTS

| | | | |
|---|---|---|---|
| 7,962,778 B2 | 6/2011 | Soran et al. | |
| 2007/0016746 A1* | 1/2007 | Kano | 711/165 |
| 2009/0287880 A1 | 11/2009 | Wright et al. | |
| 2011/0107028 A1 | 5/2011 | Louis et al. | |

FOREIGN PATENT DOCUMENTS

WO    WO2004/036424 A2    4/2004

* cited by examiner

*Primary Examiner* — Sanjiv Shah
*Assistant Examiner* — Mark Giardino, Jr.
(74) *Attorney, Agent, or Firm* — John H. Holcombe (57) ABSTRACT

A main data storage system has a main storage control and data storage, and a user interface, the main storage control in communication with a local storage control of a local data storage system with local data storage. In response to a request to increase data storage from the user interface, the main control determines whether the main data storage is out of space. If so, the main control sends a command to the local control to create data space in local data storage. The local control creates the data space and associates the data space with the main control; and, in response to the local control creating data space in the local data storage and notifying the main control, the main control updates its metadata with respect to the data space, creating the impression that all the data is stored in the main data storage.

3 Claims, 9 Drawing Sheets

OBTAINING ADDITIONAL DATA STORAGE FROM ANOTHER DATA STORAGE SYSTEM

FIELD OF THE INVENTION

This invention relates to computer-implemented data storage systems, and more particularly to expanding the available data storage capacity of a data storage system.

BACKGROUND OF THE INVENTION

Data storage systems comprising one or more data storage controls and accompanying data storage, for example an International Business Machines Corp. (IBM®) ESS (Enterprise Storage Server) such as a DS8000™, have the capability to increase overall storage capacity by adding additional storage devices. In one example, storage expansion frames may be added to the data storage or storage devices may be added to an existing storage expansion frame. The storage expansion frames are directly attached to the storage control through cables.

Once the storage capacity is increased, the user may create more volumes or increase the size of one or more volumes.

There are storage controls that do not have storage expansion frames or that have not added additional storage expansion frames. Thus, once all the storage is used up, the only way for a user to create new volumes or increase volume size is to delete volumes or to migrate volume data to tape, and then delete the volume to make space. Another possible solution is to move some applications to an alternate data storage system or control, and then to migrate the volumes that application uses to the alternate system or control and accompanying data storage, for example, through the host system. Each of these options takes time.

SUMMARY OF THE INVENTION

Methods, data storage systems, and computer program products are provided for expanding the available data storage capacity of a data storage system.

In one embodiment of a main data storage system comprising a main computer-implemented storage control and data storage, and a user interface, the main storage control in communication with a local computer-implemented storage system, the local data storage system comprising a local computer-implemented storage control and data storage, the following is performed:

in response to a request to increase data storage from the user interface, the main storage control determines whether the main data storage is out of space;

if the main data storage is out of space, the main storage control sends a command to the local storage control to create data space in local data storage, the local storage control associating the created data space with the main storage control; and in response to the local storage control creating data space in the local data storage and notifying the main storage control, the main storage control updates its metadata with respect to the data space.

In a further embodiment, the main storage control, as the result of determining that the main data storage is out of space, first notifies the user interface of the out of space condition; and sends the command after receiving authorization from the user interface to use the local storage control and data storage.

In another embodiment, wherein the data space is a new volume, the main storage control updates its metadata by creating the new volume.

In a further embodiment, the main storage control, in response to receiving I/O with respect to the new volume, passes through I/O data to the local storage control.

In a still further embodiment, in response to a command from the user interface to rebalance data storage, and obtaining space in the main storage, the command is forwarded to the local storage control; the local storage control sends command to the main storage control to search for storage space sufficient for the new volume in the main storage; the main storage control searches for storage space in the main storage and, if sufficient storage space is found, notifies the local storage control; the local storage control associates the found storage space with the new volume; and the main storage control updates volume metadata with information from the local storage control, and updates a volume with data from the local data storage, and issues a command to the local storage control to delete the new volume.

In another embodiment, wherein the data space is an expansion of size of an existing volume of the main storage, the metadata update identifies original and expanded areas of the volume.

In a further embodiment, the main storage control, in response to receiving I/O with respect to the existing volume for the expanded area, passes through I/O data to the local storage control; and in response to receiving I/O with respect to the existing volume for the original area, stores I/O data in the original area.

In a still further embodiment, the metadata update creates a new volume in the local data storage, and writes data from the existing volume of the main storage to the local storage controller to be written to the local data storage.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
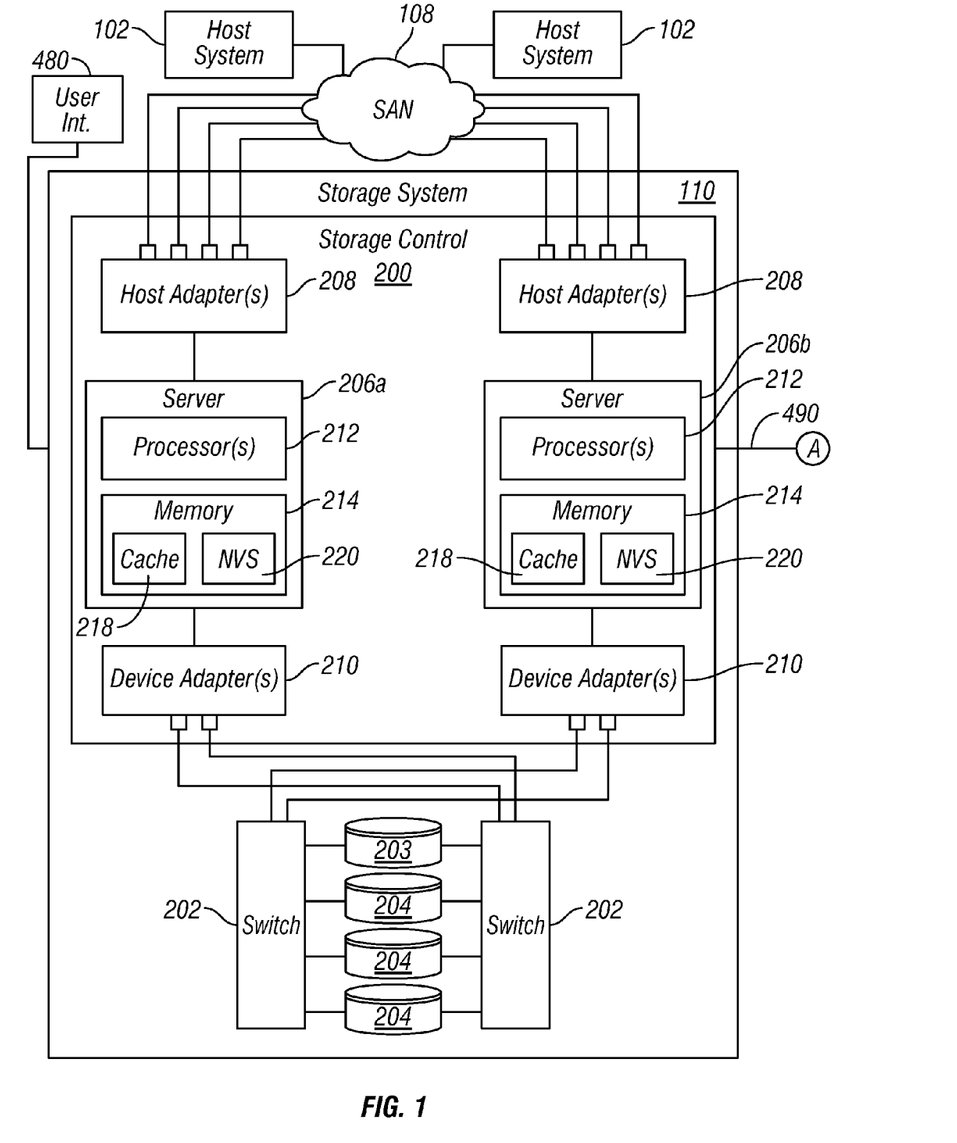
FIG. 1 is a block diagram of an exemplary computer-based storage architecture with multiple storage systems which may implement the present invention.
Figure 2:
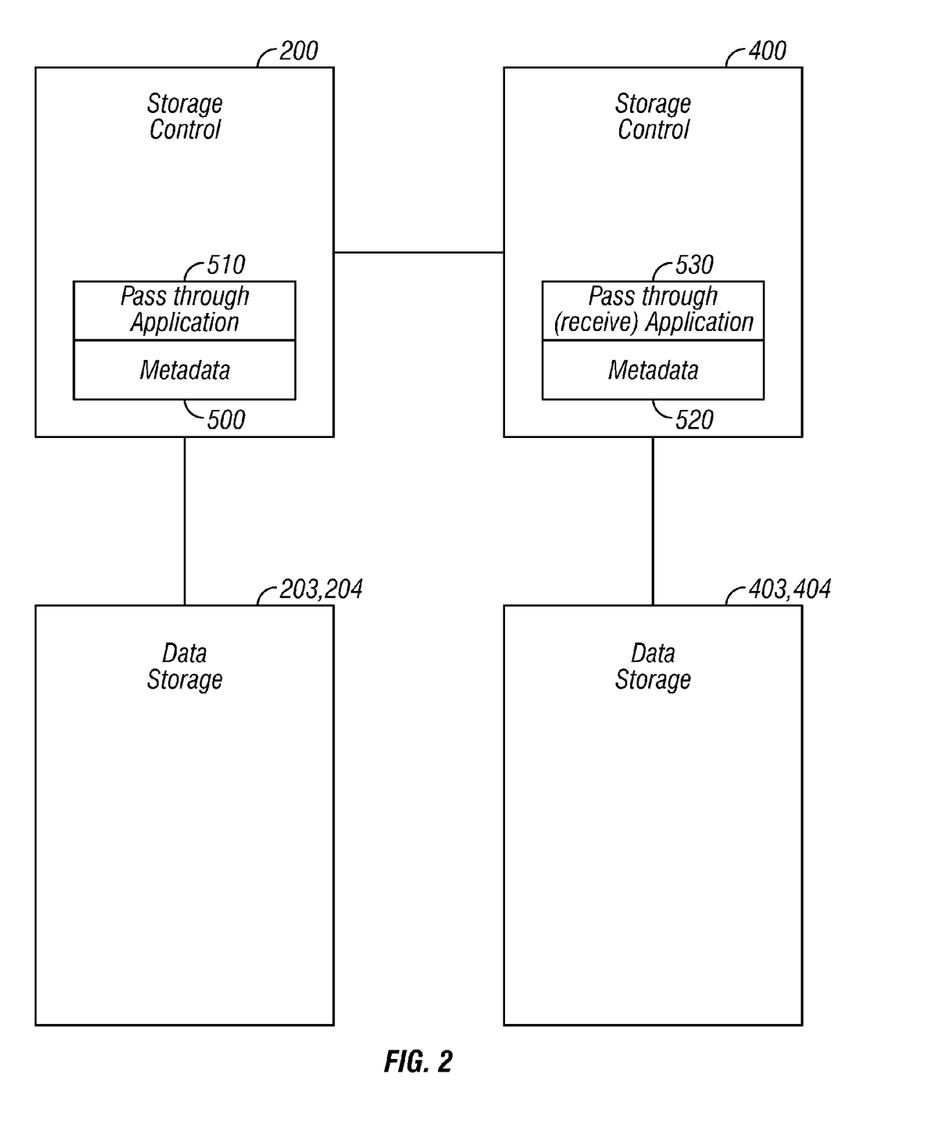
FIG. 2 is a block diagram of portions of the storage systems of FIG. 1.

Referring to FIGS. 1 and 2, an example of a computer-based storage system architecture 100 is illustrated. The architectural arrangement comprises one of many which may implement the present invention. The architecture 100 is presented only by way of example and is not intended to be limiting. The computer-implemented data storage system and methods disclosed herein may be applicable to a wide variety of different computers, servers, data storage systems, and storage architectures.

The exemplary storage architecture 100 may comprise one or more host computer systems 102, 302 coupled to one or more networks, such as a storage area network (SAN) 108. The network 108 may comprise any suitable private or public interconnection using any suitable protocol. The storage systems 110, 310, each comprise a storage control 200, 400 configured to transfer data to and from and to control the operation of switches 202, 402 and data storage 203, 403 and 204, 404. The data storage may comprise, for example, arrays of solid-state drives and hard disk drives accessible via switches 202, 402. Alternatively or additionally, the data storage 203, 403 and 204, 404 may comprise individual devices or may comprise data storage libraries with many devices. All or any of the host systems 102, 302 may direct and utilize the storage system 110, 310 and utilize the storage control 200, 400 and any data caching system therein.

For the purpose of illustration, storage system 110 comprises a "Main" storage system, and storage system 310 comprises a "Local" storage system.

As shown, each storage control 200, 400 comprises one or more servers 206, 406. Each control 200, 400 may also comprise host adapters 208, 408 and device adapters 210, 410 to provide the interfaces to connect the control 200, 400 to host systems 102, 302 and data storage 203, 403 and 204, 404, respectively. Multiple servers 206a, 206b, 406a, 406b may provide redundancy to ensure that data is always available to connected hosts 102, 302. Thus, in storage system 110, should one server 206a fail, the other server 206b may remain functional to ensure that data transfer is able to continue between the host systems 102 and the data storage 203 and 204. This process may be referred to as "failover". Similarly, in storage system 310, should one server 406a fail, the other server 406b may remain functional to ensure that data transfer is able to continue between the host systems 302 and the data storage 403 and 404.

One example of a storage system 110, 310 having an architecture similar to that illustrated in FIG. 1 is the DS8000™ Enterprise Storage Server of International Business Machines Corp. (IBM®). The DS8000™ is a high performance, high capacity storage control providing data storage that is designed to support continuous operations and implement virtualization of data storage, and is presented herein only by way of embodiment examples and is not intended to be limiting. Thus, the storage systems discussed herein are not limited to the DS8000™, but may be implemented in any comparable storage control 200, 400, regardless of the manufacturer, product name, or components or component names associated with the system 110.

In the example of FIG. 1, each storage system server 206, 406 may comprise one or more computer processors 212, 412 and memory 214, 414. The computer processors 212, 412 may comprise internal processing and storage capabilities to store software modules that run on the processors and, inter alia, are used to access data in the data storage 203, 403 and 204, 404.

The memory 214, 414 may comprise a cache 218, 418. Whenever a host 102, 302 accesses data from a storage system 110, 310, for example in a read operation, the server 206, 406 that performs the operation, for example reading data from storage 203, 403 and 204, 404 may save the data in its cache 218, 418 in the event it may be required again. If the data is accessed again by a host 102, 302, the server 206, 406 may fetch the data from the cache 218, 418 instead of fetching it from storage 203, 403 and 204, 404, saving both time and resources. Similarly, when a host system 102, 302 performs a write, the server 206, 406 may store, or host system 102, 302 may direct that the data be stored, in cache 218, 418 to be destaged to the storage 203, 403 and 204, 404 at a later time. When a write is stored in cache 218, 418, the write may also be stored in non-volatile storage (NVS) 220, 420 of the opposite server 206, 406 so that the write can be recovered by the opposite server 206, 406 in the event the first server 206, 406 fails. Thus, herein, discussions regarding storage 203, 403 and 204, 404 may or may not include cache 218, 418, and non-volatile storage (NVS) 220, 420.

Referring to FIGS. 1 and 2, each storage system 110, 310 may comprise both data storage 204, 404, such as hard disk drives, and data storage 203, 403, such as solid state drives (SSDs) based on flash memory. The input/output (I/O) performance of SSD drives or other types of solid state memory is typically far faster than the I/O performance of hard disk drives.

Data storage systems additionally offer the user an interface with respect to the storage system, for example in the form of Command Line Interface (CLI) commands or with Graphical User Interface (GUI) commands at a user interface 480. While the depicted embodiment shows the user interface 480 residing at the storage control 200, in other embodiments, the user may interact with the storage systems via a host 102, etc.

The main storage control 200, for example at servers 206a and/or 206b, stores metadata 500 and an application 510 for storing data. The local storage control 400, for example at servers 406a and/or 406b, stores metadata 520 and a related application 530 for storing data.

The storage systems 110, 310 and the main storage control 200 and the local storage control 400, operate as separate storage systems, storing data respectively in data storage 203, 204 and in data storage 403, 404. The main storage control 200 and local storage control 400 of the two storage systems 110, 310 are in communication via link 490. The link 490 may comprise any suitable communication link, examples of which comprise SCSI, Fiber optics, or direct.

The user, via the user interface 480 may supervise the usage of the data storage systems. In one embodiment, in response to a user request to increase data storage at storage system 110 from the user interface 480, the main storage control 200 determines whether the main data storage 203, 204 is out of space. If the main data storage 203, 204 is out of space, the main storage control 200 sends a command to the local storage control 400 via link 490 to create data space in local data storage 403, 404. The local storage control 400 may create the data space, and associates the created data space with the main storage control 200. In response to the local storage control 400 creating data space in the local data storage 403, 404 and notifying the main storage control 200, the main storage control updates its metadata 500 with respect to the data space.

Thus, the storage systems 110, 310 handle the creation of added data space with respect to storage system 110 as designated by the user and, by updating and using the metadata 500 in the main storage control 200, the main storage control provides an impression to the host systems 102 that all the data is stored at storage system 110. The host systems 102 therefore do not have to track data in two different storage systems.

Figure 3:
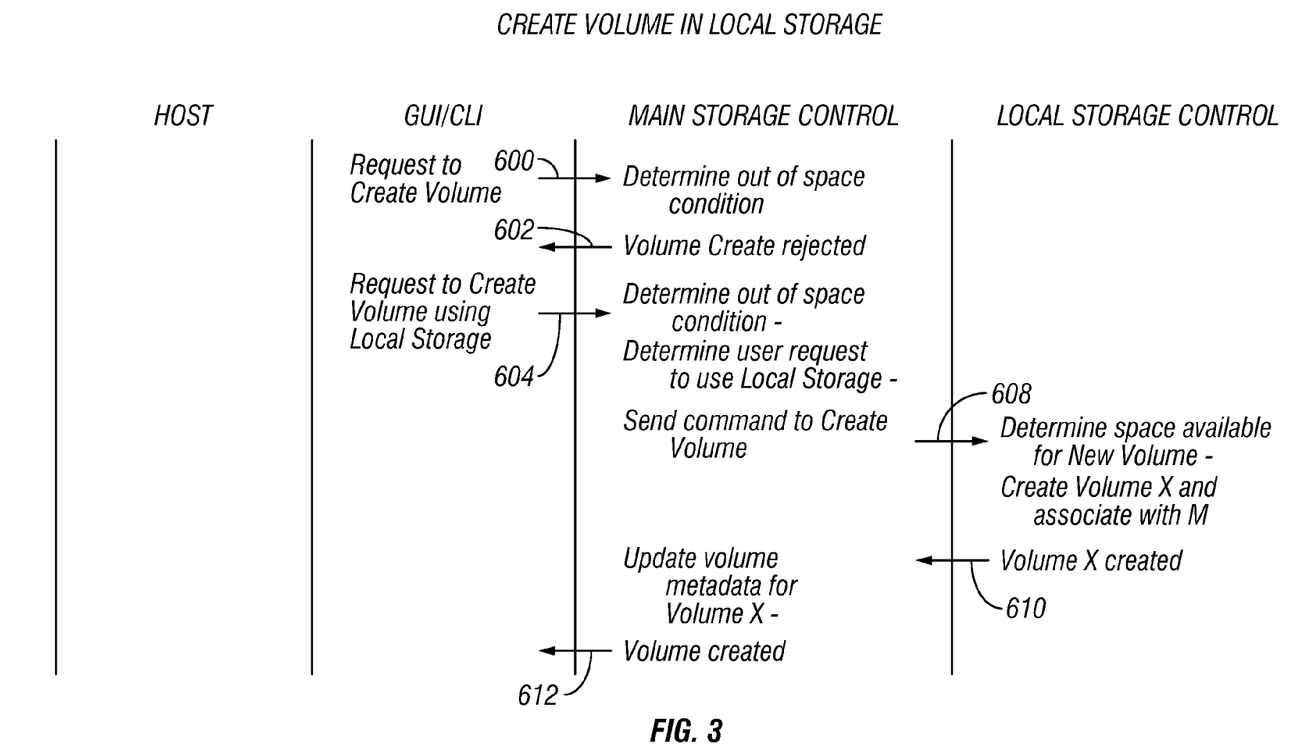
FIGS. 3, 4, 5, 6, 7 and 8 are diagrammatic illustration of various actions and states of the storage systems of FIGS. 1 and 2.

Referring additionally to FIG. 3, an example of the states and operations of a host 102, the user interface 480, the main storage control 200 and the local storage control 400 are illustrated for creating a volume in local storage 403, 404.

At step 600, the user at the user interface 480 issues a request to create a volume, and the main storage control 200 determines that there is an out of space condition for storage 203, 204. At step 602, since there is no space to create a new volume, the main storage control rejects the volume create request.

The user, aware of the application 510, at step 604, issues a second request to create a volume, but this will use the application 510 to create the volume using the local storage 403, 404. The main storage control again determines that there is an out of space condition for storage 203, 204. To save effort, one embodiment may allow for storage 203, 204 to be checked again in case space has become available. Main storage control 200 determines that there is direction to use local storage, and, at step 608, issues a command to the local storage control over link 490 to create the volume. The local storage control 400, using application 530, determines that there is space available for the new volume, and creates the new volume "X" at local storage 403, 404, and associates the new volume with the main storage control 200.

At step 610, the local storage control 400 indicates that volume "X" has been created. The main storage control 200 updates its volume metadata for volume "X", and, at step 612, indicates to the host interface 480 that the volume has been created.

With the metadata 500 updated at main storage control 200, the main storage control 200 provides an impression to the host systems 102 that all the data is stored at storage system 110. The host systems 102 therefore do not have to track data in two different storage systems.

The application 510 may also be used for resizing storage, expanding the storage from the main storage system 110 to include local storage system 310.

Figure 4:
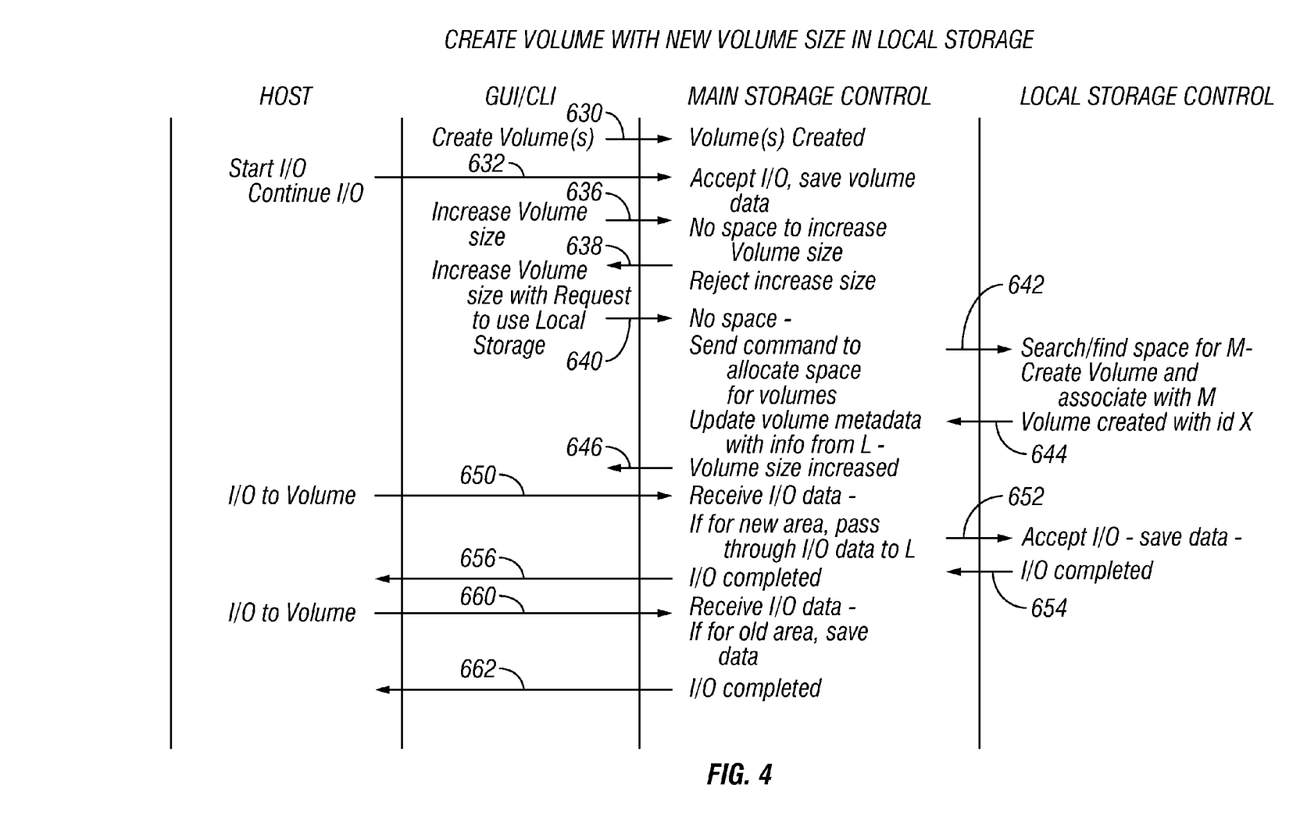

Referring to FIGS. 1, 2 and 4, a request to create one or more volumes is generated at the user interface 480 at step 630, and the volume(s) are created by the main storage control 200 at storage 203, 204 in the normal course of operation. Also as a part of the normal course of operation, at step 632, a host system 102 conducts I/O (input/output) with respect to the storage system 110. The main storage control 200 accepts the I/O and saves the data in storage 203, 204.

At step 636, the user, at user interface 480, requests an increase in volume size. If the storage control 200 determines that there is insufficient space in storage 203, 204 to accommodate the request, at step 638, the main storage control 200 rejects the request to increase the volume size.

The user, aware of the application 510, at step 640, issues a second request to increase volume size, but this will use the application 510 to increase volume size using the local storage 403, 404. The main storage control again determines that there is an out of space condition for storage 203, 204. To save effort, one embodiment may allow for storage 203, 204 to be checked again in case space has become available. Main storage control 200 determines that there is direction to use local storage, and, at step 642, issues a command to the local storage control over link 490 to find extra space for the main storage system and to create the volume(s) at a larger size. In one embodiment, the volume(s) created in local storage 403, 404 are partial volumes comprising the increase in space required to increase the size of the volume(s).

The local storage control 400, using application 530, determines that there is space available for the large sized volume(s), and creates the volume(s) "X".

At step 644, the local storage control 400 indicates that volume(s) "X" have been created. The main storage control 200 updates its volume metadata for volume(s) "X", and, at step 646, indicates to the host interface 480 that the volume size has been increased.

The metadata 500, at step 644, indicates to the storage control that the data for each volume is now split between main storage 203, 204 and local storage 403, 404. With the metadata 500 updated at main storage control 200, the main storage control 200 provides an impression to the host systems 102 that all the data is stored at storage system 110. The host systems 102 therefore do not have to track data in two different storage systems. This is illustrated at step 650 with an I/O request by a host system 102 to the main storage control 200. If the I/O is for the new area, at step 652, the main storage control 200 passes the I/O and data via link 490 to the local storage control 400. The local storage control 400 accepts the I/O and saves the data in the new area of the volume. At step 654, the local storage control 400 indicates that the I/O is completed, and, at step 656, using the application 510, indicates to the host system 102 that the I/O is completed. Alternatively, if the I/O is for the old area in storage 203, 204, the main storage control 200, at step 660, receives the I/O and saves the data, indicating at step 662 that the I/O is completed.

Figure 5:
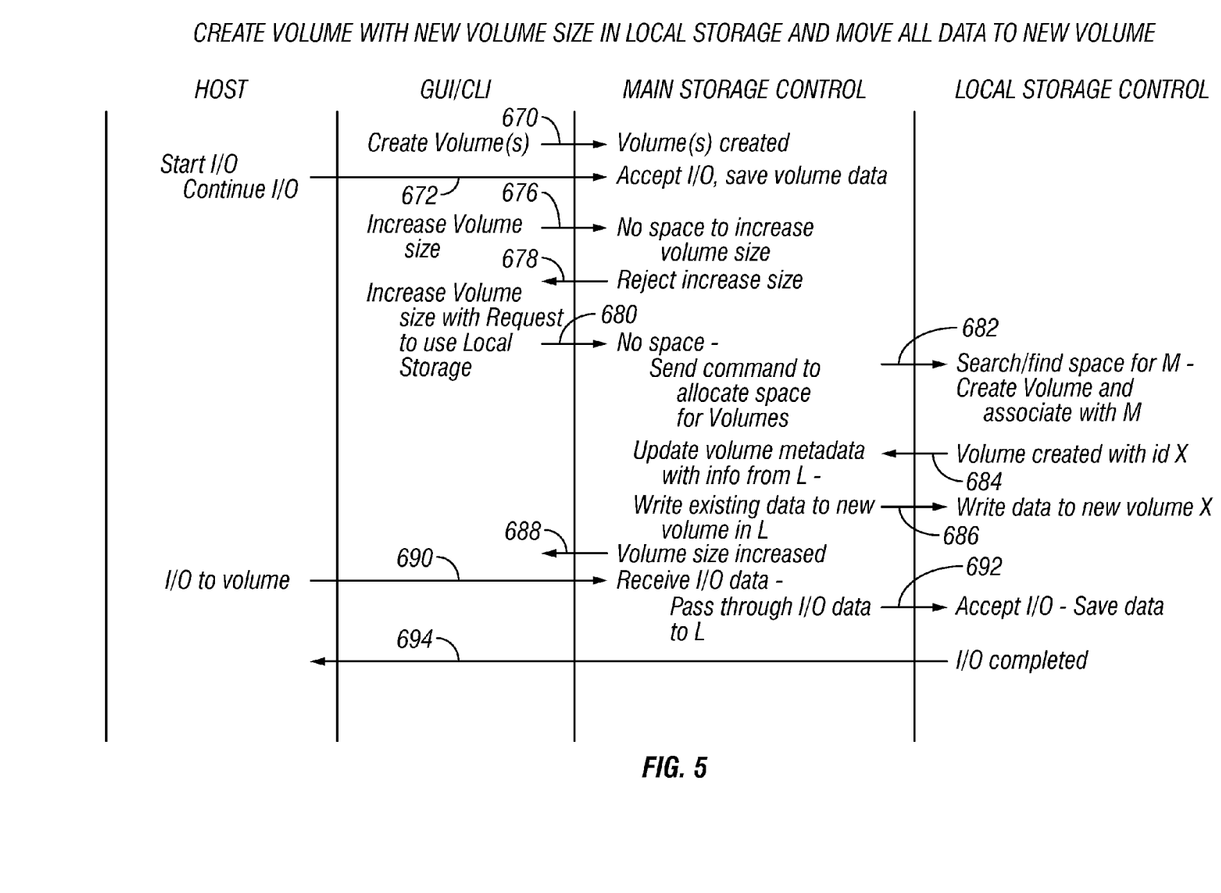

Referring to FIGS. 1, 2 and 5, an alternative methodology for increasing volume size is to create a volume with the new volume size in the local storage 203, 204 and move all of the data to the new volume. In one example, in the normal course of operation, a request to create one or more volumes is generated at the user interface 480 at step 670, and the volume(s) are created by the main storage control 200 at storage 203, 204. Also as a part of the normal course of operation, at step 672, a host system 102 conducts I/O (input/output) with respect to the storage system 110. The main storage control 200 accepts the I/O and saves the data in storage 203, 204.

At step 676, the user, at user interface 480, requests an increase in volume size. If the storage control 200 determines that there is insufficient space in storage 203, 204 to accommodate the request, at step 678, the main storage control 200 rejects the request to increase the volume size.

The user, aware of the application 510, at step 680, issues a second request to increase volume size, but this will use the application 510 to increase volume size using the local storage 403, 404. The main storage control again determines that there is an out of space condition for storage 203, 204. To save effort, one embodiment may allow for storage 203, 204 to be checked again in case space has become available. Main storage control 200 determines that there is direction to use local storage, and, at step 682, issues a command to the local storage control over link 490 to find extra space for the main storage system and to create the volume(s) at a larger size.

The local storage control 400, using application 530, determines that there is space available for the large sized volume(s), and creates the volume(s) "X".

At step 684, the local storage control 400 indicates that volume(s) "X" have been created. The main storage control 200 updates its volume metadata for volume(s) "X", indicating that the entire volume is to be at local storage 403, 404 and, at step 686, writes the existing data to the new volume at local storage 403, 404. The local storage control 400 writes the data to the local storage 403, 404, and the main storage control 200, at step 688 indicates to the host interface 480 that the volume size has been increased.

The metadata 500, at step 644, indicates to the storage control that the data for each volume is now at local storage 403, 404. With the metadata 500 updated at main storage control 200, the main storage control 200 provides an impression to the host systems 102 that all the data is stored at storage system 110. The host systems 102 therefore do not have to track data in the local storage system. This is illustrated at step 690 with an I/O request by a host system 102 to the main storage control 200. At step 692, the main storage control 200 passes the I/O and data via link 490 to the local storage control 400. The local storage control 400 accepts the I/O and saves the data in the new volume which has the increased size. At step 694, the local storage control 400, using the application 530, 510 indicates, via main storage control 200 to the host system 102 that the I/O is completed.

Figure 6:
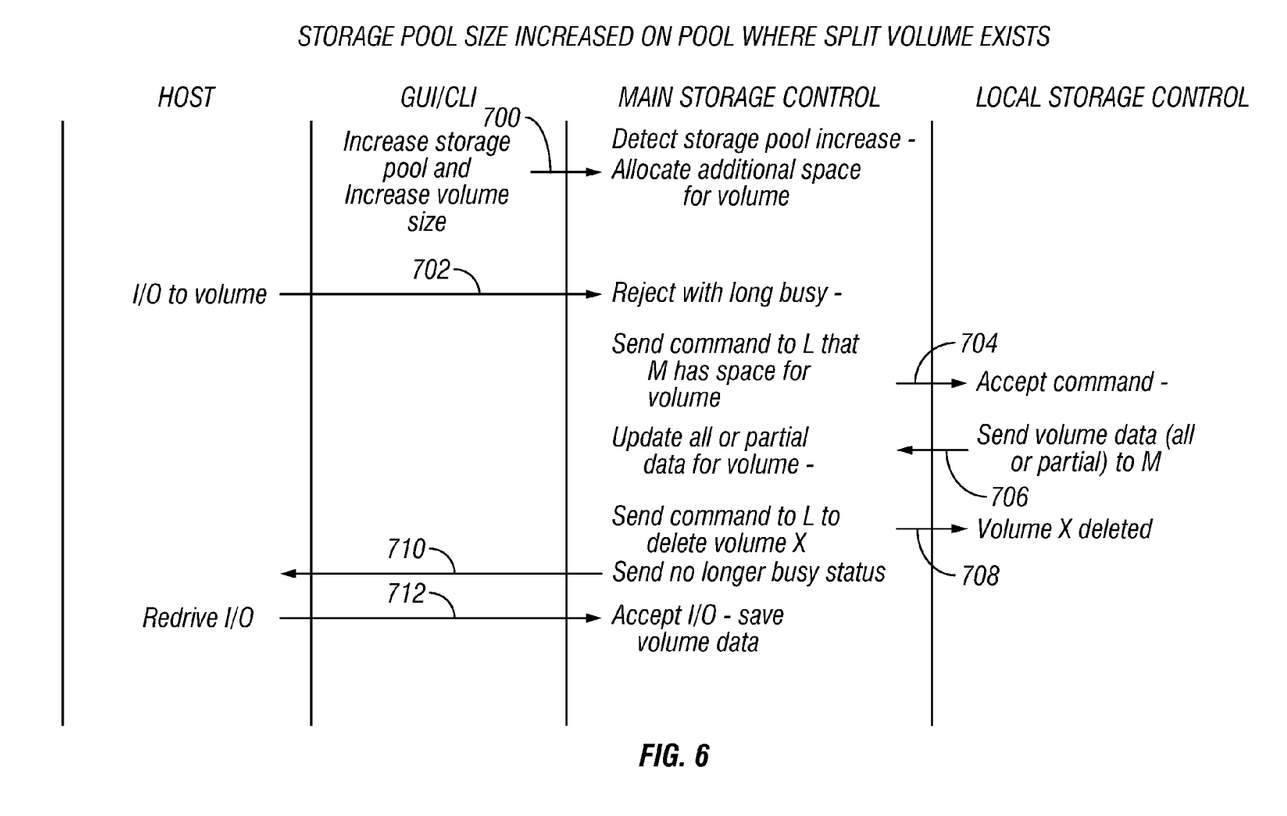

Referring to FIGS. 1, 2 and 6, another situation is the increase in the storage pool represented by main storage 203, 204. An increase in the available storage pool may be accomplished by the addition of devices to the storage, or by the substitution of larger capacity devices for the previous devices.

Step 700 represents an increase in the main storage pool and an input at the user interface 480 to increase the volume size for one or more volumes. The main storage control 200 detects the storage pool increase and allocates additional space for the volume(s) whose size is increased. In one embodiment, no data is moved at this time.

At step 702, a host I/O 102 for data in a volume that is wholly or partially in local storage 403, 404 is rejected with a long busy. The main storage control 200, in step 704, sends a command to the local storage control 400 that main storage 203, 204 has space for the requested volume. The local storage control 400 accepts the command and, in step 706, sends volume data to the main storage control. In accordance with the application 530, the amount of data sent is based on the amount of data to send and the amount of space that has been added to the volume due to the increase in size. If the increase in size is enough to accommodate all of the data stored in local storage 403, 404, all of the data in local storage is sent. If the increase in size is not enough to accommodate all of the data stored in local storage 403, 404, a lesser amount of the data in local storage is sent.

In accordance with application 510, the main storage control 200 updates the volume in main storage 203, 204 with the data (all or partial) from the local storage control 400, and, if all of the data has been sent from the local storage 403, 404, in step 708, sends a command to the local storage control to delete the local version of the data. The local storage control 200 then deletes the volume in its records. If only partial data was sent to the main storage, then the main storage control leaves the data remaining at the local storage system 310 intact and/or requests that the local storage control delete only the data that has been sent to the main storage system 110.

At step 710, the main storage control sends a no longer busy status to the requesting host system 102.

At step 712, the host system 102 may redrive the I/O. The I/O is accepted by the main storage control 200 and saves the data to the resized volume in main storage 203, 204. If only partial data has been sent to the main storage and part of the volume remains in local storage, at step 712, the main storage control 200 acts in the same manner as FIG. 4 to obtain the data and respond to the I/O.

Figure 7:
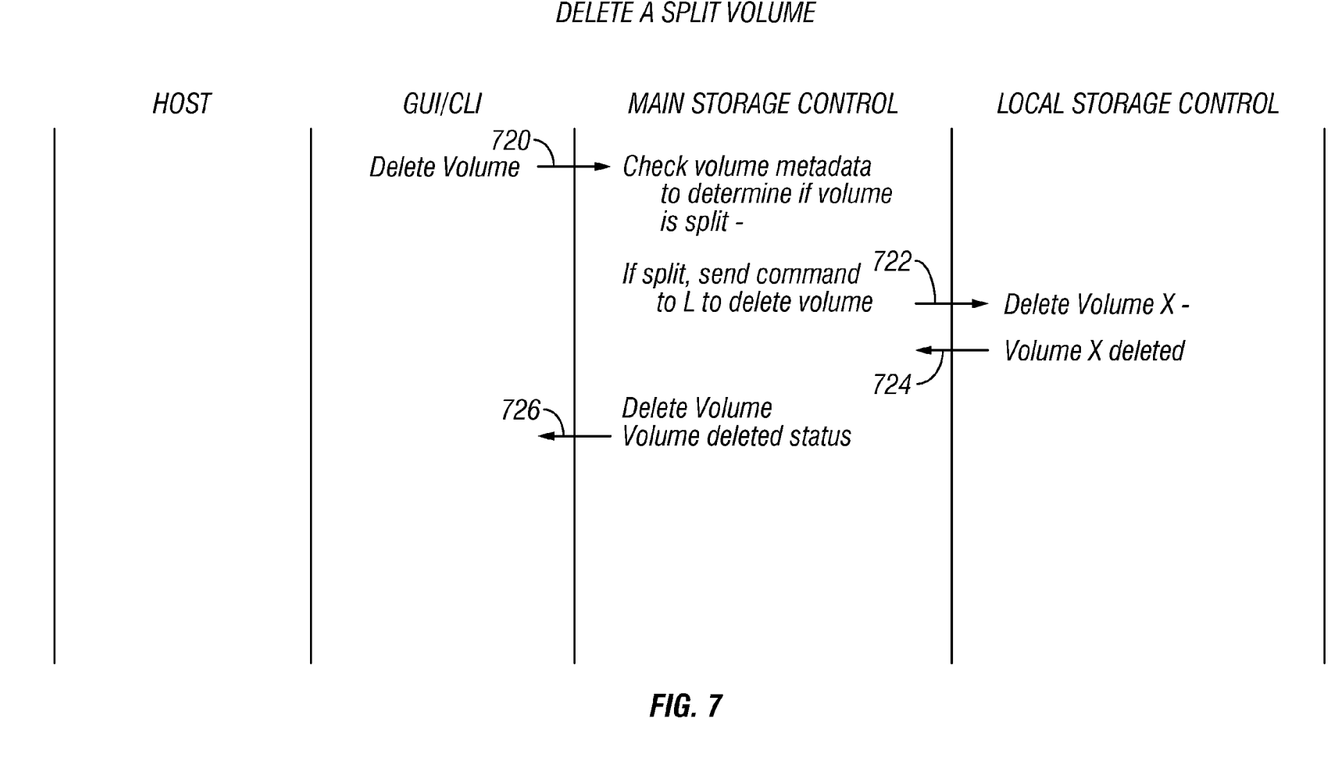

FIG. 7 represents the deletion of a volume that is split between the main storage 203, 204 and the local storage 403, 404. Referring to FIGS. 1, 2 and 7, at step 720, the user at user interface 480 requests deletion of a volume. The main storage control 200 checks the volume metadata 500 to determine whether the volume is split. If it is not split, the main storage control deletes the volume in an ordinary operation. If the volume is split, in step 722, the main storage control, in accordance with application 510, sends a command to the local storage control 400 via link 490 to delete the volume.

The local storage control deletes the volume, and, in step 724, indicates to the main storage control via link 490 that the volume has been deleted. The main storage control 200 then deletes the volume, and, in step 726, indicates to the user at user interface 480 a volume deleted status.

Figure 8:
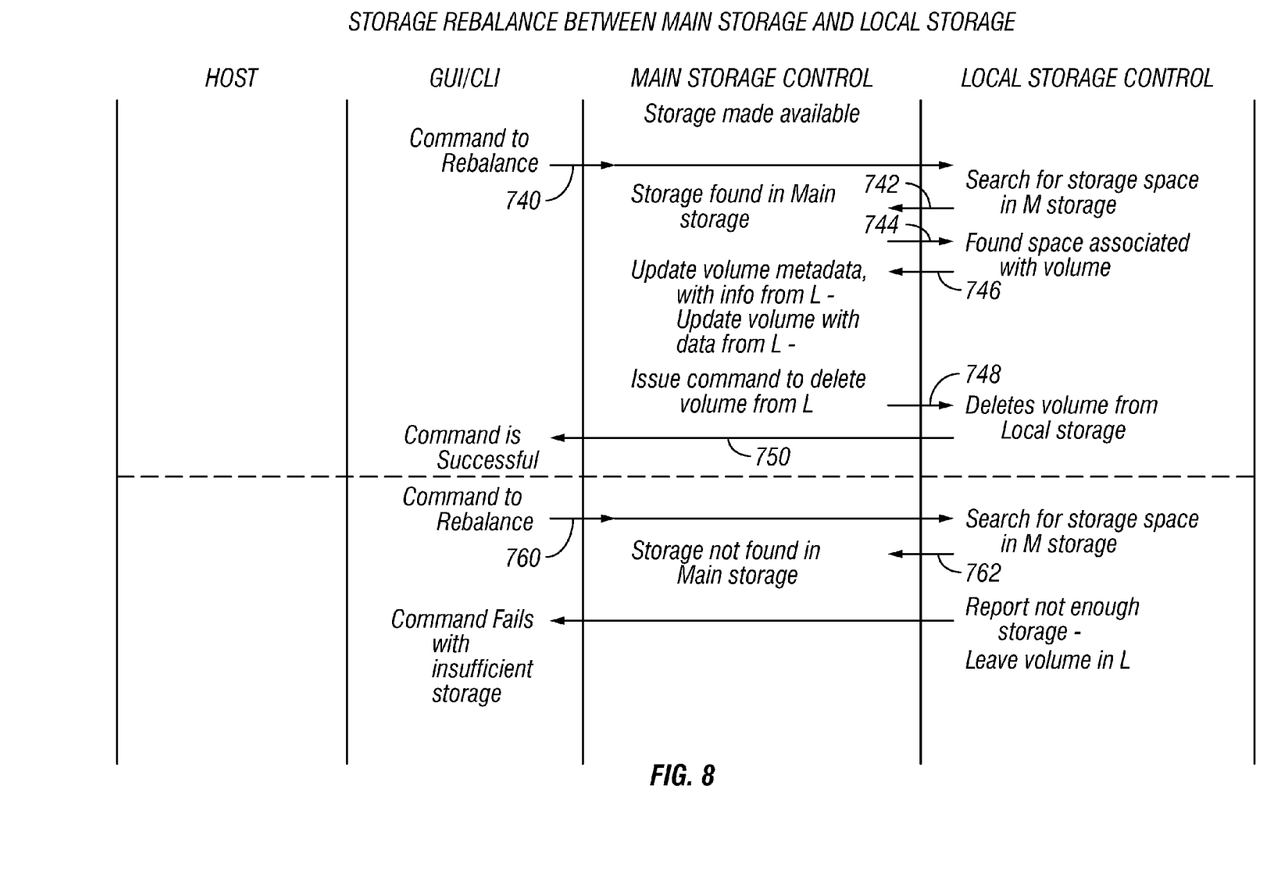

Referring to FIGS. 1, 2 and 8, storage may be made available at the main storage 203, 204. For example, data stored in main storage 203, 204 may be migrated to tape or other storage as is known in the art. Once the storage is available, the user at user interface 480, may provide a command at step 740 to rebalance between local storage 403, 404 and main storage 203, 204 by moving data back to the main storage.

The command at step 740, in one embodiment, is issued to the main storage control 200 and is forwarded to local storage control 400 so that both storage controls can cooperate. The local storage control 400, at step 742, searches for storage space in the main storage 203, 204, for example by requesting the information from the metadata 500 of the main storage control 200. Once the storage space is found in the main storage 203, 204, at step 744, the local storage control, using application 530, associates found space in main storage with a volume of the local storage, and notifies the main storage control at step 746.

The main storage control 200 updates the volume metadata 500 with information from the local storage control 400 and also updates the volume at main storage 203, 204 with data of the volume from the local storage 403, 404. At step 748, with all the current data transferred from the volume at the local storage to the volume at the main storage, the main storage control 200 issues a command to delete the volume from the local storage. In a rebalance operation, the intended outcome is to move data to minimize the split volumes and to maximize the number of complete volumes at the main storage 203, 204 consistent with the amount of storage that has been made available.

The local storage control 400 deletes the volume from local storage and, in step 750, notifies the user at user interface 480 of the deletion, and the GUI/CLI indicates to the user that the command is successful.

The amount of space that was made available at the main storage 203, 204 may not be sufficient to rebalance all of the volumes back to the main storage. Thus, in response to a command at step 760 to rebalance between local storage 403, 404 and main storage 203, 204, which is issued to the main storage control 200 and is forwarded to local storage control 400, the local storage control 400, at step 762, searches for storage space in the main storage 203, 204, for example by requesting the information from the metadata 500 of the main storage control 200, and may not find available storage. Without enough storage space at the main storage 203, 204, the local storage control 200 instead, at step 764, reports to the user interface that there is not enough storage and leaves the volume or portion of the volume in the local storage. The GUI/CLI indicates to the user that the command fails due to insufficient storage at the main storage 203, 204.

A person of ordinary skill in the art will appreciate that the embodiments of the present invention, disclosed herein, including the computer-implemented systems 110, 310 for storing data for the system 100 of FIG. 1 and for the storage of data in both systems and creating the impression with the metadata 500 and applications 510 and 530 that the data is stored only at main data storage, and the functionality provided therein, may be embodied as a system, method or computer program product. Accordingly, embodiments of the present invention may take the form of an entirely hardware embodiment, an entirely software embodiment (including firmware, resident software, micro-code, etc.) or a combination thereof, such as an embodiment combining software and hardware aspects that may all generally be referred to herein as a "circuit," "module" or "system." Furthermore, embodiments of the present invention may take the form of a computer program product embodied in one or more non-transitory computer readable medium(s) having computer readable program code embodied thereon.

Any combination of one or more non-transient computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code embodied on a computer readable medium may be transmitted using any appropriate medium, including but not limited to wireless, wireline, optical fiber cable, RF, etc. or any suitable combination of the foregoing.

Computer program code for carrying out operations for embodiments of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the present invention are described above with reference to illustrations and/or block diagrams of methods, apparatus (systems) and computer program products according to embodiments of the invention. It will be understood that each step of the illustrations and/or block diagrams, and combinations of steps in the illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the illustrations and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the illustrations and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the illustrations and/or block diagram block or blocks.

Those of skill in the art will understand that changes may be made with respect to the methods discussed above, including changes to the ordering of the steps. Further, those of skill in the art will understand that differing specific component arrangements may be employed than those illustrated herein.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A method for storing data with a data storage system comprising a main computer-implemented storage control and data storage, and a user interface, said main storage control in communication with another computer-implemented storage control, the method comprising:

in response to a request to increase data storage from said user interface, said main storage control determining whether said main data storage is out of space;

if said main data storage is out of space, said main storage control sending a command to said another storage control to create data space in another data storage, said data space created by said another storage control associated with said main storage control;

in response to said another storage control creating data space in said another data storage and notifying said main storage control, said main storage control updating its metadata with respect to said data space;

said main storage control, as the result of determining that said main data storage is out of space, first notifies said user interface of said out of space condition; and sends said command after receiving authorization from said user interface to use said another storage control and data storage;

wherein said data space is a new volume, and said main storage control updates its metadata by creating said new volume;

said main storage control, in response to receiving I/O with respect to said new volume, passes through I/O data to said another storage control;

in response to a command from said user interface to rebalance data storage, and obtaining space in said main storage, said command forwarded to said another storage control, said another storage control sends command to said main storage control to search for storage space sufficient for said new volume in said main storage;

said main storage control searches for storage space in said main storage and, if sufficient storage space is found, notifies said another storage control;

said another storage control associates said found storage space with said new volume;

said main storage control updates volume metadata with information from said another storage control, and updates a volume with data from said another data storage, and issues a command to said another storage control to delete said new volume.

2. Data storage systems for storing data, comprising:

a main data storage system comprising a main computer-implemented storage control and data storage, and a user interface, said main storage control in communication with said main computer-implemented storage control, another data storage system comprising another computer-implemented storage control and data storage;

said main storage control, in response to a request to increase data storage from said user interface, determining whether said main data storage is out of space;

if said main data storage is out of space, said main storage control sending a command to said another storage control to create data space in said another data storage, said data space created by said another storage control associated with said main storage control; and in response to said another storage control creating data space in said another data storage and notifying said main storage control, said main storage control updating its metadata with respect to said data space;

said main storage control, as the result of determining that said main data storage is out of space, first notifies said user interface of said out of space condition; and sends said command after receiving authorization from said user interface to use said another storage control and data storage;

wherein said data space is a new volume, and said main storage control updates its metadata by creating said new volume;

wherein said main storage control, in response to receiving I/O with respect to said new volume, passes through I/O data to said another storage control;

said main storage control, in response to a command from said user interface to rebalance data storage, and obtaining space in said main storage, said command forwarded to said another storage control;

said another storage control sends command to said main storage control to search for storage space sufficient for said new volume in said main storage;

said main storage control searches for storage space in said main storage and, if sufficient storage space is found, notifies said another storage control;

said another storage control associates said found storage space with said new volume; and said main storage control updates volume metadata with information from said another storage control, and updates a volume with data from said another data storage, and issues a command to said another storage control to delete said new volume.

3. A computer program product for storing data with data storage systems comprising a main computer-implemented storage control and data storage, and a user interface, and another computer-implemented storage control and data storage, said main storage control in communication with said another computer-implemented storage control, said computer program product comprising computer-usable storage medium having non-transitory computer-usable program code embodied therein, said computer-usable program code comprising:

computer-usable program code for said main storage control to, in response to a request to increase data storage from said user interface, determine whether said main data storage is out of space;

computer-usable program code for said main storage control to, if said main data storage is out of space, send a command to said another storage control to create data space in said another data storage, said data space created by said another storage control associated with said main storage control; and computer-usable program code for said main storage control to, in response to said another storage control creating data space in said local data storage and notifying said main storage control, update its metadata with respect to said data space;

computer-usable program code for said main storage control to, as the result of determining that said main data storage is out of space, first notify said user interface of said out of space condition; and send said command after receiving authorization from said user interface to use said another storage control and data storage;

wherein said data space is a new volume, and additionally comprising computer-usable program code for said main storage control to update its metadata by creating said new volume;

computer-usable program code for said main storage control to, in response to receiving I/O with respect to said new volume, pass through I/O data to said another storage control;

computer-usable program code for said main storage control to, in response to a command from said user interface to rebalance data storage, and obtain space in said main storage, and forward said command to said another storage control;

computer-usable program code for said another storage control to send a command to said main storage control to search for storage space sufficient for said new volume in said main storage;

computer-usable program code for said main storage control to search for storage space in said main storage and, if sufficient storage space is found, notify said another storage control;

computer-usable program code for said another storage control to associate said found storage space with said new volume; and computer-usable program code for said main storage control to update volume metadata with information from said another storage control, and update a volume with data from said another data storage, and issue a command to said another storage control to delete said new volume.

* * * * *